US007283947B2

(12) United States Patent
Holubar et al.

(10) Patent No.: US 7,283,947 B2
(45) Date of Patent: Oct. 16, 2007

(54) METHOD AND SYSTEM FOR TRANSLATION MANAGEMENT OF SOURCE LANGUAGE TEXT PHRASES

(75) Inventors: Kevin R. Holubar, Austin, TX (US); Gregory A. Jones, Austin, TX (US); Nicole Muirhead, Round Rock, TX (US); Rebecca L. Roberts, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 09/864,120

(22) Filed: May 24, 2001

(65) Prior Publication Data

US 2003/0033137 A1 Feb. 13, 2003

(51) Int. Cl.
G06F 17/28 (2006.01)
G06F 17/20 (2006.01)
G06F 17/27 (2006.01)

(52) U.S. Cl. .................................. 704/2; 704/7; 704/4

(58) Field of Classification Search ............... 704/2–10
See application file for complete search history.

(56) References Cited

U.S. PATENT DOCUMENTS

| 5,193,191 | A | * | 3/1993 | McKeeman et al. ........ 717/162 |
| 5,511,188 | A | * | 4/1996 | Pascucci et al. ............ 707/203 |
| 5,535,120 | A | | 7/1996 | Chong et al. |
| 5,805,832 | A | * | 9/1998 | Brown et al. ................... 711/1 |
| 6,092,037 | A | | 7/2000 | Stone et al. |
| 6,163,785 | A | | 12/2000 | Carbonell et al. |
| 6,360,358 | B1 | * | 3/2002 | Elsbree et al. .............. 717/120 |
| 6,526,426 | B1 | * | 2/2003 | Lakritz ....................... 715/536 |
| 6,567,820 | B1 | * | 5/2003 | Scheifler et al. ............ 719/315 |
| 6,728,950 | B2 | * | 4/2004 | Davis et al. ................. 717/136 |

* cited by examiner

Primary Examiner—Tālivaldis Ivars Šmits
Assistant Examiner—Abdelali Serrou
(74) Attorney, Agent, or Firm—Cardinal Law Group

(57) ABSTRACT

A computer system for implementing a method for managing translations of text phrases is disclosed. The system stores text phrases in a source language as individual entries within a database. The system also stores any imported text phrases in a target language as individual entries within the database. For each text phrase in the source language stored within the database, the system is operable to communicate a notification of an exclusion of a corresponding text phrase in the target language within the database. Also for each stored text phrase stored in the source language within the database, the system is operable to communicate a notification of a modification of a text phrase in the source language as stored within the database after a storage of a corresponding text phrase in the target language within the database.

3 Claims, 7 Drawing Sheets

METHOD AND SYSTEM FOR TRANSLATION MANAGEMENT OF SOURCE LANGUAGE TEXT PHRASES

BACKGROUND OF THE INVENTION

1. Field of the Invention

The present invention generally relates to the translation of text phrases from a source language to a target language. The present invention specifically relates to a management of such a translation that facilitates an effective operation of a source code control system.

2. Description of the Related Art

Software developers utilize some form of a source code control system for organizing, tracking, and maintaining an evolving source code configuration of a national language support (NLS) application. Each text phrase (e.g., "File", "Edit", "View", "Insert", "Format", "Tools", "Table", "Window" and "Help" on a toolbar of a word processing NLS application) in a source language (hereinafter "source language text phrase") is extracted from the source code and placed within an external master text file which serves as a basis for multiple translation of the source language text phrases therein. While known source code control systems can perform a comprehensive management of the source code configuration, the prior art source code control systems typically fail to perform a comprehensive management of the master text file during various translation of the source language text phrases therein.

Specifically, such systems often fail to address several issues. The first issue is a modification of a source language text phrase within the master text file while minimizing, if not preventing, inadvertent overwrites and corruption of other source language text phrases within the master text file. The second issue is an importation management of a translated text file that provides a notification of the translated text file being an incomplete translation of the master text file. The third issue is an importation management of a translated version of a source language text phrase (hereinafter "target language text phrase") being a translation of an incorrect version of the source language text phrase. The present invention addresses these issues.

SUMMARY OF THE INVENTION

The present invention relates to a method and a system for translation management of master text files that overcomes the disadvantages associated with the prior art. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a method for managing a translation of a master text file. A first source language text phrase is stored as a first entry within a database. A target language text phrase as a translated version of the first source language text phrase is stored within the database after a storage of the first source language text phrase within the database. A second source language text phrase as a modified version of the first source language text phrase is stored within the database after a storage of the first source language text phrase within the database. A notification indicating the target language text phrase is an incorrect translation is communicated when the second source language text phrase is stored within the database after a storage of the target language text phrase within the database.

A second form of the present invention is a method for managing a master text file including a source language text phrase. The source language text phrase is stored as a first entry within a database. A translated text file corresponding to the master text file is imported. The translated text file includes one or more target language text phrases. Each target language text phrase is stored as an individual entry within the database. A notification indicating the translated text file is an incomplete translation of the master text file is communicated when all of the target language text phrases fail to correspond to the source language text phrase.

A third form of the present invention is a system for managing a translation of a master text file. The system comprises a database and a computer. The computer is operable to control a storage of a first source language text phrase is stored as a first entry within a database; a storage of a target language text phrase as a translated version of the first source language text phrase within the database after a storage of the first source language text phrase within the database; and a storage of a second source language text phrase as a modified version of the first source language text phrase within the database after a storage of the first source language text phrase within the database. The computer is further operable to communicate a notification indicating the target language text phrase is an incorrect translation when the second source language text phrase is stored within the database after a storage of the target language text phrase within the database.

A fourth form of the present invention is a system for managing a master text file including a source language text phrase. The system comprises a database and a computer. The computer is operable to control a storage of the source language text phrase as a first entry within a database; an importation of translated text file corresponding to the master text file, the translated text file including one or more target language text phrases; and a storage of each target language text phrase as an individual entry within the database. The computer is further operable to communicate a notification indicating the translated text file is an incomplete translation of the master text file when all of the target language text phrases fail to correspond to the source language text phrase.

A fifth form of the present invention is a computer program product in a computer readable medium for managing a translation of a master text file. The computer program product comprises computer readable code for storing a first source language text phrase is stored as a first entry within a database; a target language text phrase as a translated version of the first source language text phrase within the database after a storage of the first source language text phrase within the database; and a second source language text phrase as a modified version of the first source language text phrase within the database after a storage of the first source language text phrase within the database. The computer program product further comprises computer readable code for communicating a notification indicating the target language text phrase is an incorrect translation when the second source language text phrase is stored within the database after a storage of the target language text phrase within the database.

A sixth form of the present invention is a computer program product in a computer readable medium for managing a master text file including a source language text phrase. The computer program product comprises computer readable code for storing the source language text phrase as a first entry within a database; importing a translated text file corresponding to the master text file, the translated text file including one or more target language text phrases; and storing each target language text phrase as an individual entry within the database. The computer program product further comprises computer readable code for communicating a notification indicating the translated text file is an incomplete translation of the master text file when all of the target language text phrases fail to correspond to the source language text phrase.

The foregoing forms and other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
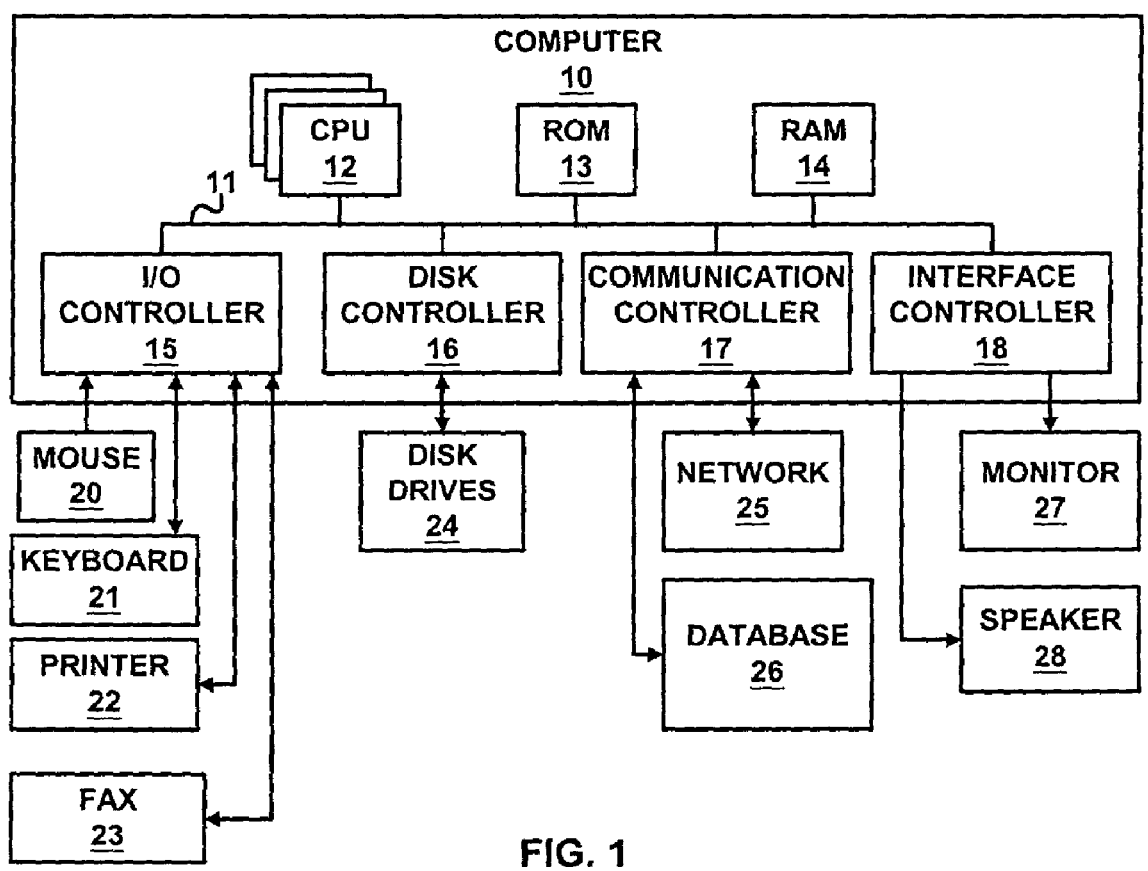
FIG. 1 is a block diagram of one embodiment of computer hardware employed in the present invention.

A computer 10 of the present invention is shown in FIG. 1. Referring to FIG. 1, computer 10 may be configured in any form for accepting structured inputs, processing the inputs in accordance with prescribed rules, and outputting the processing results as would occur to those having ordinary skill in the art, such as, for example, a personal computer, a workstation, a super computer, a mainframe computer, a minicomputer, a super minicomputer, and a microcomputer. Preferably, as shown, computer 10 is a server including a bus 11 for facilitating electrical communication among one or more central processing units (CPU) 12, a read-only memory (ROM) 13, a random access memory (RAM) 14, an input/output (I/O) controller 15, a disk controller 16, a communication controller 17, and a user interface controller 18.

CPU 12 is preferably one of the Intel families of microprocessors, one of the AMD families of microprocessors, one of the Motorola families of microprocessors, or one of the various versions of a Reduced Instruction Set Computer microprocessor such as the PowerPC chip manufactured by International Business Machine Corporation (IBM). ROM 13 stores various controlling programs such as the Basic Input-Output System (BIOS) developed by IBM. RAM 14 is the memory for loading an operating system and selectively loading controlling programs and application programs.

Controller 15 is an aggregate of controllers for facilitating an interaction between CPU 12 and pointing devices such as a mouse 20 and a keyboard 21, and between CPU 12 and output devices such as a printer 22 and a fax 23. Controller 16 is an aggregate of controllers for facilitating an interaction between CPU 12 and data storage devices such as disks drives 24 in the form of a hard drive, a floppy drive, and a compact-disc drive. The hard drive of disk drives 24 stores a conventional operating system, such as an AIX operating system or an OS/2 operating system by IBM. Controller 17 is an aggregate of controllers for facilitating an interaction between CPU 12 and a network 25, and between CPU 12 and a database 26 stored on a local or remote storage device. Controller 18 is an aggregate of controllers for facilitating an interaction between CPU 12 and a graphic display device such as a monitor 27, and between CPU 12 and an audio device such as a speaker 28.

Those having skill in the art will appreciate alternative computer hardware embodiments of computer 10 for implementing the principles of the present invention.

Figure 2:
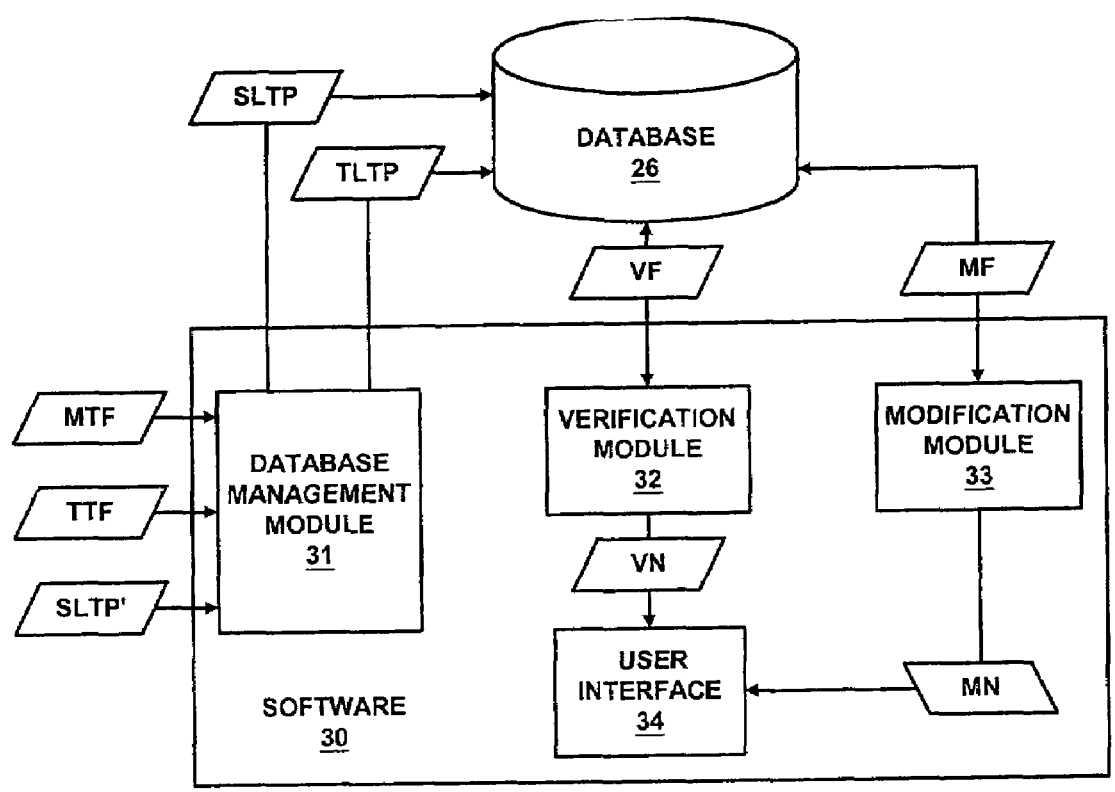
FIG. 2 is a block diagram of one embodiment of computer software employed in the FIG. 1 computer hardware.

Referring additionally to FIG. 2, computer 10 includes translation management software 30 for implementing a master text file storage routine 40 (FIG. 3), a translated text file routine 50 (FIG. 4), a source language text phrase modification routine 60 (FIG. 5), an incomplete translation routine 70 (FIG. 6), and an incorrect translation routine 80 (FIG. 7) under control of the operating system. Software 30 is a computer program physically stored within a hard drive of disk drives 24 whereby the hard drive is a computer readable medium that is electrically, magnetically, optically, or chemically altered to store computer readable code. In other embodiments of computer 10, software 30 can be stored in other computer readable mediums of computer 10, such as the CD-ROM drive of disk drives 24, or software 30 can be downloaded to computer 10 via network 25. Also in other embodiments of computer 10, software 30 can be partially or fully implemented with digital circuitry, analog circuitry, or both.

A functional description of software 30 will now be described herein by the description of data transfers and signal transmissions between software 30 and database 26 during execution of the various routines of the present invention. First, an implementation of routine 40 (FIG. 3) by a database management module 31 of software 30 to initially store a master text file MTF within database 26 is described. Master text file MTF includes multiple source language text phrases such as source language text phrase SLTP. Second, an implementation of routine 50 (FIG. 4) by database management module 31 to store a translated text file TTF within database 26 is described. Translated text file TTF includes multiple target language text phrases such as a target language text phrase TLTP that corresponds to source language text phrase SLTP.

Third, an implementation of routine 60 (FIG. 5) by database management module 31 to store a modified version SLTP' of source language text phrase SLTP within database 26 is described. Fourth, an implementation of routine 70 (FIG. 6) by a verification notification module 32 of software 30 to generate a verification notification VN indicating an incomplete translation of master text file MTF by translated text file TTF is described. Finally, an implementation of routine 80 (FIG. 7) to generate a modification notification MN indicating an incorrect translation of source language text phrase SLTP by target language text phrase TLTP is described. Those having ordinary skill in the art will appreciate the physical elements of computer 10 that are associated with such data transfers and signal transmissions.

Figure 3:
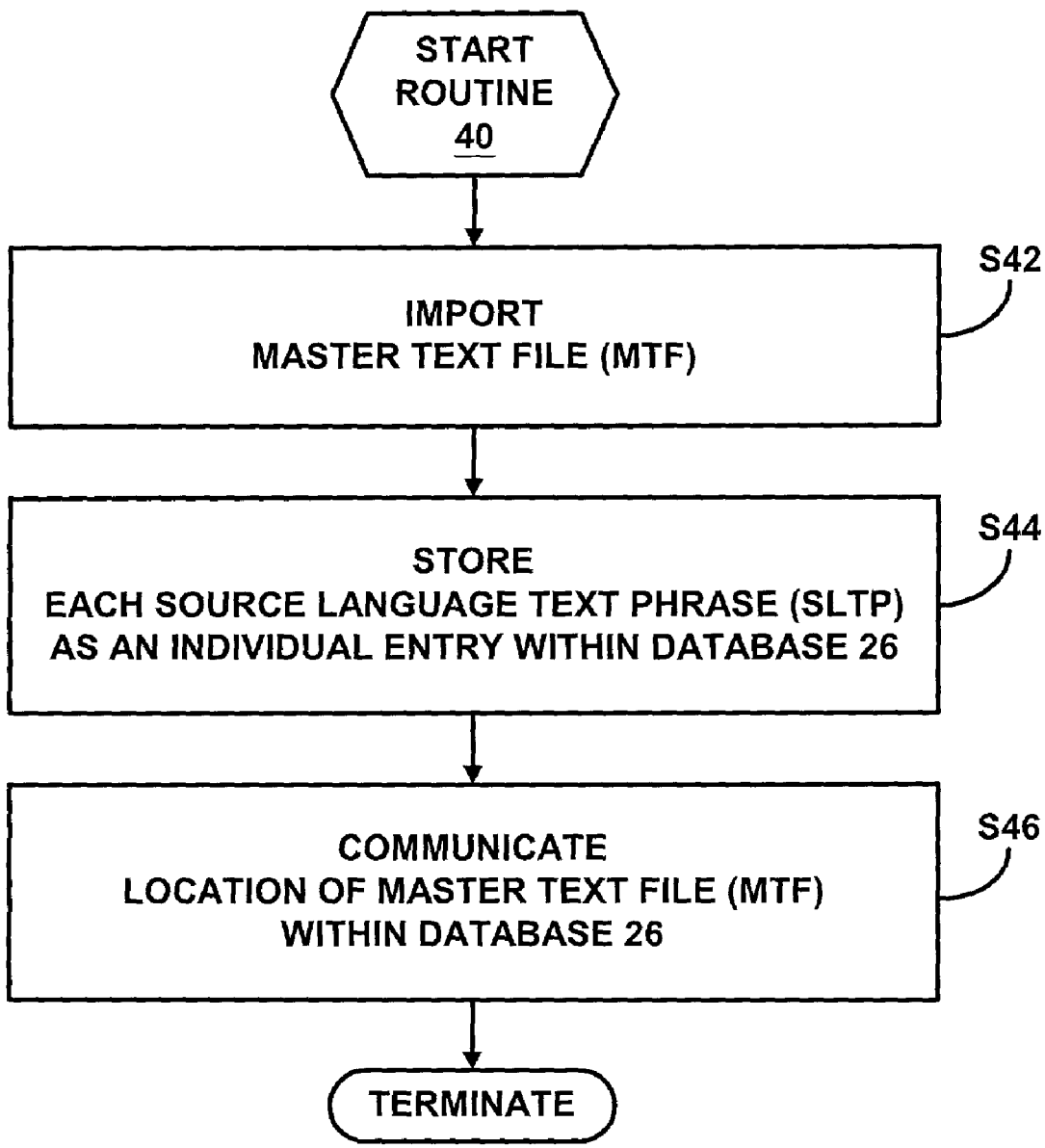
FIG. 3 is a flow chart of one embodiment in accordance with the present invention of a master text file storage routine implemented by the FIG. 2 computer software.

Referring to FIGS. 1-3, module 31 imports master text file MTF during a stage S42 of routine 40 in response to appropriate commands (not shown) from a source code manager (not shown) via a user interface 34 of software 30 (e.g., a graphical user interface or a network interface). Module 31 thereafter proceeds to a stage S44 of routine 40 to store each source language text phrase of master text file MTF as individual entries within database 26. The following TABLE 1 illustrates one embodiment of a database table for each individual entry of a source language text phrase of master text file MTF:

TABLE 1

| ROW NO. | SOURCE LANGUAGE TEXT PHRASE | SOURCE ID. NO. | SOURCE TIME-STAMP | VERIFI-CATION FLAG | MODIFI-CATION FLAG |
| --- | --- | --- | --- | --- | --- |
| 1 | "FILE" | 1 | Date/Time | Reset/Set | Reset/Set |
| 2 | "EDIT" | 2 | Date/Time | Reset/Set | Reset/Set |
| 3 | "VIEW" | 3 | Date/Time | Reset/Set | Reset/Set |
| 4 | "INSERT" | 4 | Date/Time | Reset/Set | Reset/Set |
| 5 | "FORMAT" | 5 | Date/Time | Reset/Set | Reset/Set |
| 6 | "TOOLS" | 6 | Date/Time | Reset/Set | Reset/Set |
| 7 | "TABLE" | 7 | Date/Time | Reset/Set | Reset/Set |
| 8 | "WINDOW" | 8 | Date/Time | Reset/Set | Reset/Set |
| 9 | "HELP" | 9 | Date/Time | Reset/Set | Reset/Set |

Figure 5:
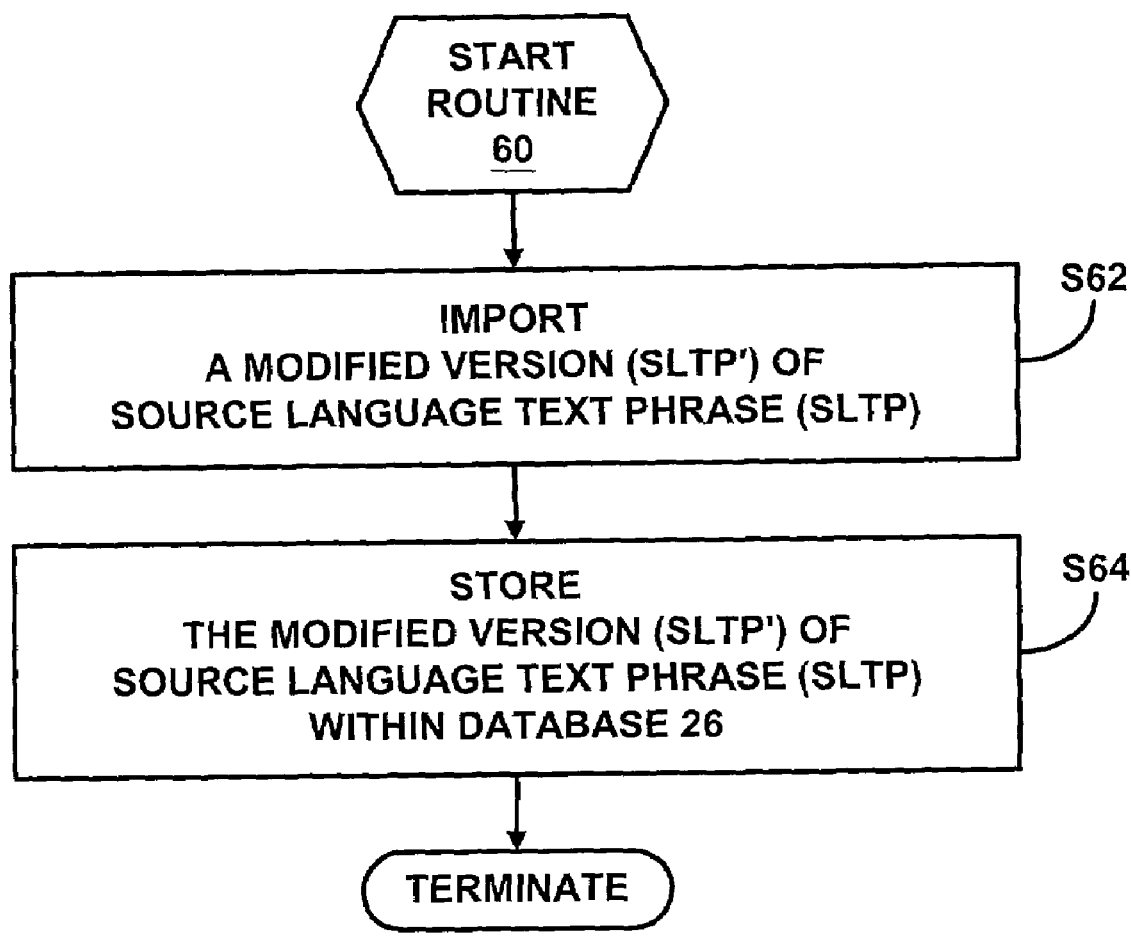
FIG. 5 is a flow chart of one embodiment in accordance with the present invention of a source language text phrase modification routine implemented by the FIG. 2 computer software.
Figure 6:
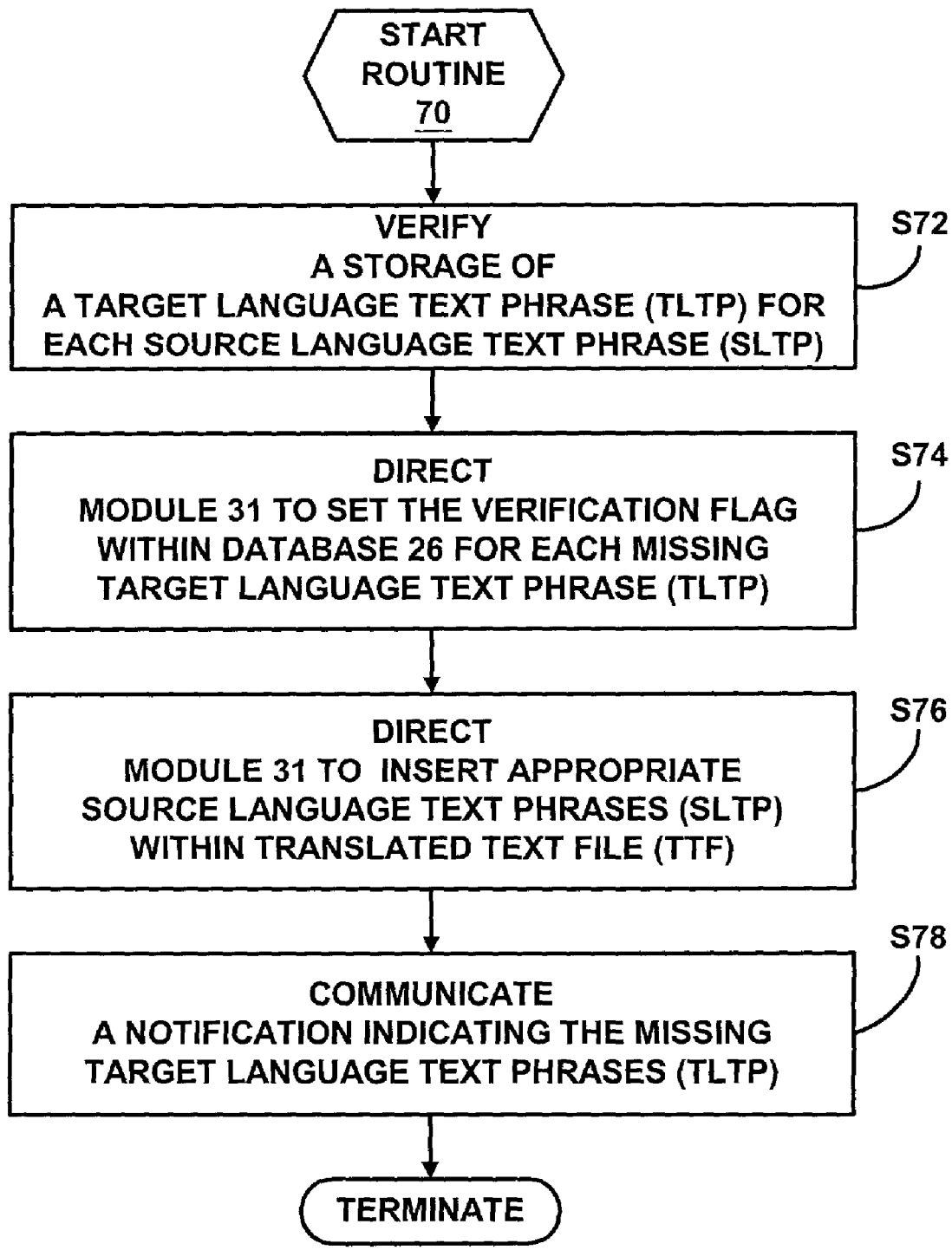
FIG. 6 is a flow chart of one embodiment in accordance with the present invention of an incomplete translation notification routine implemented by the FIG. 2 computer software.
Figure 7:
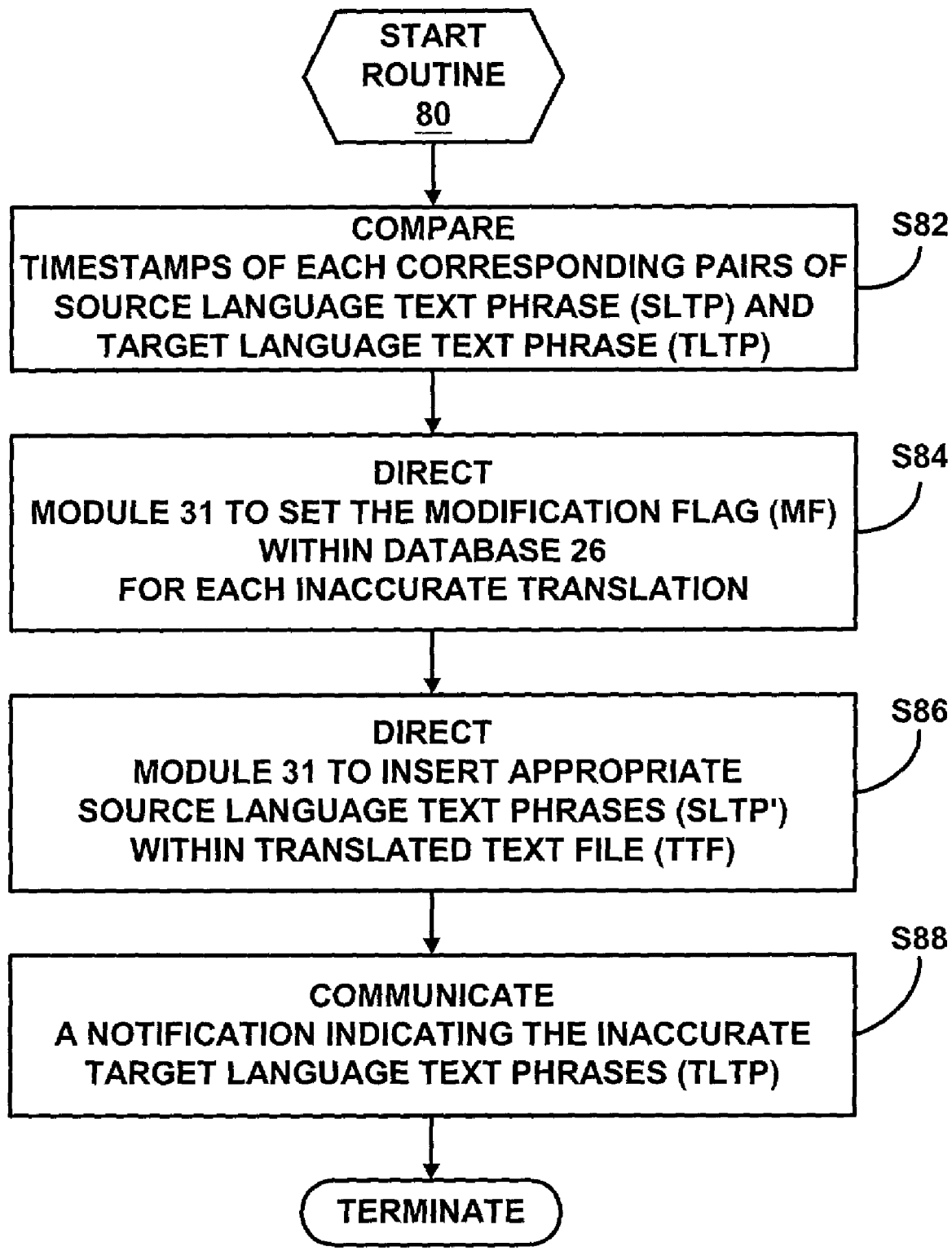
FIG. 7 is a flow chart of one embodiment in accordance with the present invention of an incorrect translation notification routine implemented by the FIG. 2 computer software.

The SOURCE ID NO. column includes data indicative of an identification number of each source language text phrase. The SOURCE TIMESTAMP column includes data indicative of a date and a time of an initial storage of a source language text phrase or a date and time of modified version of a source language text phrase as will be further described herein in connection with routine 60 (FIG. 5). The flags of the VERIFICATION FLAG column are initially reset and are selectively set as will be further described herein in connection with routine 70 (FIG. 6). The MODIFICATION FLAG column is initially reset and is selectively set as will be further described herein in connection with routine 80 (FIG. 7).

Module 31 thereafter proceeds to a stage S46 of routine 40 to communicate the location of master text file MTF within database 26 (e.g., rows 1-9) to module 32 and module 33. Routine 40 is terminated upon completion of stage S46.

Figure 4:
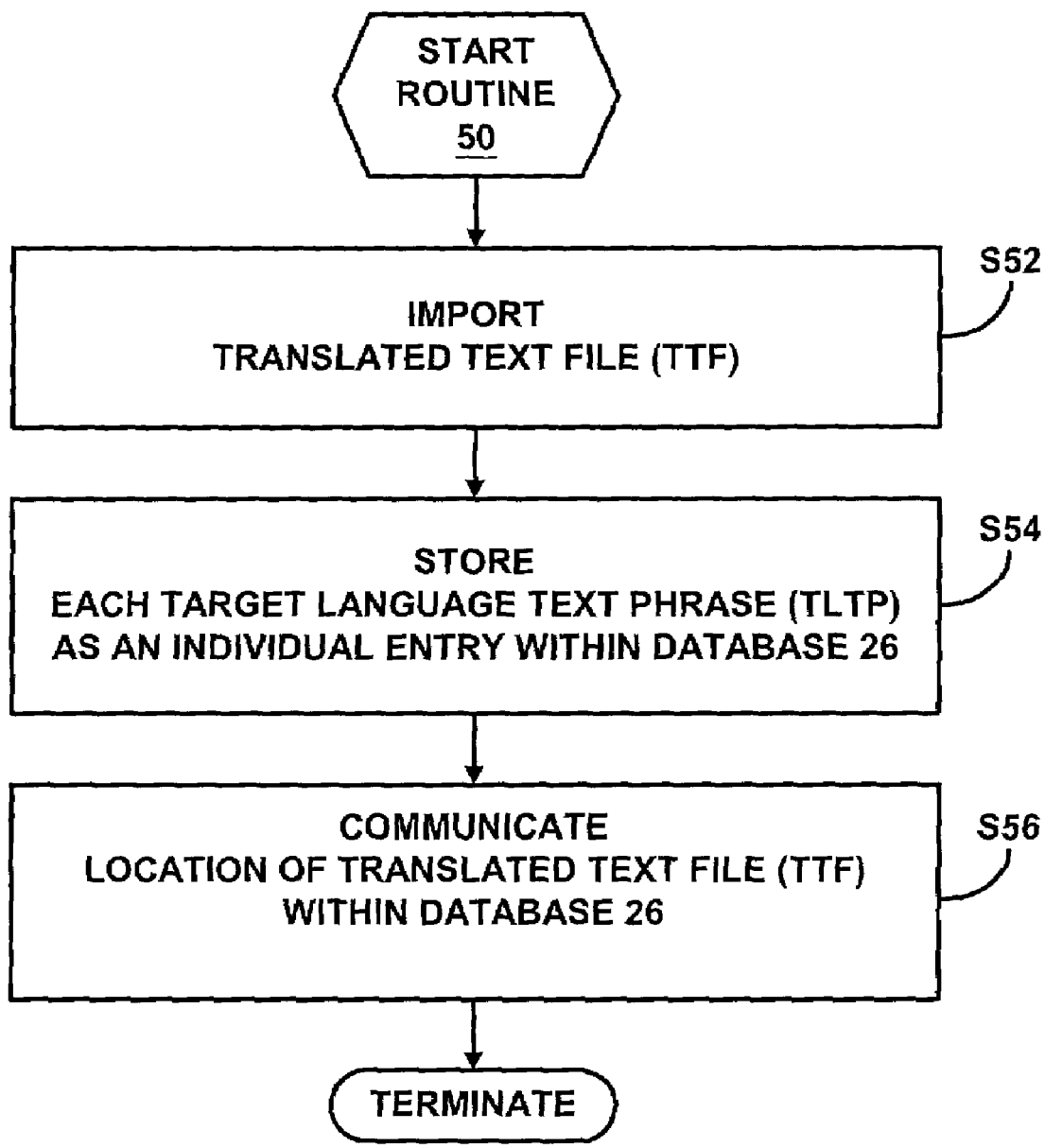
FIG. 4 is a flow chart of one embodiment in accordance with the present invention of a translated text file storage routine implemented by the FIG. 2 computer software.

Referring to FIGS. 1, 2, and 4, module 31 imports translated text file TTF during a stage S52 of routine 50 in response to appropriate commands (not shown) from a source code manager (not shown) via user interface 34. Module 31 thereafter proceeds to a stage S54 of routine 50 to store each target language text phrase of translated text file TTF as individual entries within database 26. The following TABLE 2 illustrates one embodiment of a database table for each individual entry of a target language text phrase of translated text file TTF:

TABLE 2

| ROW NO. | TARGET LANGUAGE TEXT PHRASE | TARGET ID NO. | TARGET TIMESTAMP |
| --- | --- | --- | --- |
| 10 | Translation of "FILE" | 1 | Date/Time |
| 11 | Translation of "EDIT" | 2 | Date/Time |
| 12 | Translation of "VIEW" | 3 | Date/Time |
| 13 | Translation of "INSERT" | 4 | Date/Time |
| 14 | Translation of "FORMAT" | 5 | Date/Time |
| 15 | Translation of "TOOLS" | 6 | Date/Time |
| 16 | Translation of "TABLE" | 7 | Date/Time |
| 17 | Translation of "WINDOW" | 8 | Date/Time |
| 18 | Translation of "HELP" | 9 | Date/Time |

The TARGET ID NO. includes data indicative of an identification number of a corresponding source language text phrase. The TIMESTAMP column includes data indicative of a date and a time of a storage of a target language text phrase. In an alternative embodiment, the TARGET TIMESTAMP column can be excluded from TABLE 2 and included within TABLE 1.

Module 31 thereafter proceeds to a stage S56 of routine 50 to communicate the location of translated text file TTF within database 26 (e.g., rows 10-18) to module 32 and module 33. Routine 50 is terminated upon completion of stage S56.

Referring to FIGS. 1, 2, and 5, module 31 imports a modified version SLTP' of source language text phrase SLTP during a stage S62 of routine 60 in response to appropriate commands (not shown) from a source code manager (not shown) via user interface 34. Module 31 thereafter proceeds to a stage S64 of routine 40 to store modified version SLTP' of source language text phrase SLTP within database 26. In one embodiment, module 31 overwrites source language text phrase SLTP with modified version SLTP' and modifies the data under the SOURCE TIMESTAMP column to reflect the storage of the modified version SLTP'. Routine 60 is terminated upon completion of stage S64.

Referring to FIGS. 1, 2, and 6, module 32 verifies a storage of a target language text phrase for each source language text phrase within database 26 during a stage S72 of routine 70 in response to appropriate commands (not shown) from a source code manager (not shown) via a user interface 34. In one embodiment, module 32 compares the SOURCE ID NO. column of TABLE 1 and the TARGET ID NO. column of TABLE 2 to ascertain whether any target language text phrases are missing from translated text file TTF. Module 32 thereafter proceeds to a stage S74 of routine 70 to direct module 31 to set the flags under the VERIFICATION FLAG column of TABLE 1 for each source language text phrase that does not have a corresponding target language text phrase stored within database 26. For example, translated text file TTF may have excluded the target language text phrase of row 10 of TABLE 2 from database 26. Thus, the flag for the source language text phrase of row 1 of TABLE 1 will be set.

Module 32 thereafter proceeds to a stage S76 of routine 70 to direct module 31 to store each source language text phrase that does not have a corresponding target language text phrase stored within database 26 into translated text file TTF. For example, with the target language text phrase of row 10 of TABLE 2 missing from translated text file TTF, the source language text phrase of row 1 of TABLE 1 will be stored in row 10 of TABLE 2. Module 32 thereafter proceeds to a stage S78 of routine 70 to communicate a verification notification VN to the source code manager (not shown) via user interface 34. The verification notification VN will indicate incomplete translation of master text file MTF by translated text file TTF. Routine 70 is terminated upon completion of stage S78.

Referring to FIGS. 1, 2, and 7, module 33 compares the timestamps of each corresponding pair of source language text phrase and target language text phrase during a stage S82 of routine 80 in response to appropriate commands (not shown) from a source code manager (not shown) via a user interface 34. In one embodiment, module 33 compares the SOURCE TIMESTAMP column of TABLE 1 and the TARGET TIMESTAMP column of TABLE 2 to ascertain whether the correct version (original or modified) of each source language text phrase was translated. The TARGET TIMESTAMP including a date and a time that is prior to corresponding date and a time of the SOURCE TIMESTAMP is an indication that the target language text phrase is a translated version of an original version of a corresponding source language text phrase instead of being a translated version of a modified version of a corresponding source language text phrase.

Module 33 thereafter proceeds to a stage S84 of routine 80 to direct module 31 to set the flags under the MODIFICATION FLAG column of TABLE 1 for each source language text phrase that was modified after a storage of a corresponding target language text phrase. For example, when target language text phrase TLTP was stored in database 26 prior to an importation and storage of the modified version STLP' of source language text phrase SLTP, then the modification flag is set. Module 33 thereafter proceeds to a stage S86 of routine 80 to direct module 31 to store each modified version of source language text phrases that have been incorrectly translated into the appropriate location of translated text file TTF. For example, the modified version STLP' of source language text phrase SLTP is written within the database entry of target language text phrase TLTP. Module 32 thereafter proceeds to a stage S78 of routine 70 to communicate a modification notification MN to the source code manager (not shown) via user interface 34. The modification notification MN will indicate an incorrect translation of one or more target language text phrases. Routine 80 is terminated upon completion of stage S88.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A computer readable medium storing a computer program for managing a translation of a master text file, said computer program code comprising:

computer readable code for storing a first source language text phrase as a first entry within a database;

computer readable code for storing a target language text phrase as a translated version of the first source language text phrase within the database after a storage of the first source language text phrase within the database;

computer readable code for storing a second source language text phrase as a modified version of the first source language text phrase within the database after a storage of the first source language text phrase within the database;

computer readable code for communicating a notification indicating the target language text phrase is an incorrect translation when the second source language text phrase is stored within the database after a storage of the target language text phrase within the database;

computer readable code for storing a first timestamp within the database that indicates a date and a time of the storage of the target language text phrase within the database; and computer readable code for storing a second timestamp within the database that indicates a date and a time of the storage of the second source language text phrase within the database; and computer readable code for storing a copy of the second source language text phrase in a translated text file containing the target language text phrase when a comparison of the first timestamp and the second timestamp indicates a storage of the second source language text phrase within the database occurred after the storage of the target language text phrase within the database wherein the computer readable code manages the translation of the master text file based on the storing.

2. The computer program product of claim 1, further comprising:

computer readable code for comparing the first timestamp and the second timestamp; and computer readable code for setting a flag within the database when a comparison of the first timestamp and the second timestamp indicates a storage of the second source language text phrase within the database occurred after the storage of the target language text phrase within the database.

3. The computer program product of claim 2, wherein said computer readable code for setting of the flag is communicated as the notification.

* * * * *